(12) United States Patent
Liu et al.

(10) Patent No.: US 12,509,792 B2
(45) Date of Patent: Dec. 30, 2025

(54) PURIFICATION METHOD FOR COPPER FOIL

(71) Applicants: SONGSHAN LAKE MATERIALS LABORATORY, Dongguan (CN); ZHONGKE CRYSTAL MATERIALS (DONGGUAN) CO., LIMITED, Dongguan (CN)

(72) Inventors: Kaihui Liu, Dongguan (CN); Jinzong Kou, Dongguan (CN); Zhiqiang Zhang, Dongguan (CN); Xiangbin Yue, Dongguan (CN); Zhi Huang, Dongguan (CN); Menglin He, Dongguan (CN); Enge Wang, Dongguan (CN)

(73) Assignees: SONGSHAN LAKE MATERIALS LABORATORY, Dongguan (CN); ZHONGKE CRYSTAL MATERIALS (DONGGUAN) CO., LIMITED, Dongguan (CN)

( * ) Notice: Subject to any disclaimer, the term of this patent is extended or adjusted under 35 U.S.C. 154(b) by 24 days.

(21) Appl. No.: 18/577,898

(22) PCT Filed: Aug. 9, 2022

(86) PCT No.: PCT/CN2022/111208
§ 371 (c)(1),
(2) Date: Jan. 9, 2024

(87) PCT Pub. No.: WO2023/193381
PCT Pub. Date: Oct. 12, 2023

(65) Prior Publication Data
US 2024/0328026 A1    Oct. 3, 2024

(30) Foreign Application Priority Data

Apr. 6, 2022 (CN) .......................... 202210357816.4

(51) Int. Cl.
C30B 1/02 (2006.01)
C22F 1/08 (2006.01)
C30B 29/02 (2006.01)

(52) U.S. Cl.
CPC .................. *C30B 1/02* (2013.01); *C22F 1/08* (2013.01); *C30B 29/02* (2013.01)

(58) Field of Classification Search
None
See application file for complete search history.

(56) References Cited

FOREIGN PATENT DOCUMENTS

| CN | 108950684 A | 12/2018 |
| CN | 109537043 A | 3/2019 |

(Continued)

OTHER PUBLICATIONS

Machine translation of CN108950684A via EPO (translated Mar. 27, 2025) (Year: 2018).*

(Continued)

*Primary Examiner* — George Wyszomierski
(74) *Attorney, Agent, or Firm* — FisherBroyles, LLP; Craig W. Mueller

(57) ABSTRACT

A purification method for a copper foil, which belongs to the field of material purification. The purification method for a copper foil comprises: placing an assembly in a central temperature zone of a tubular furnace, and annealing same for at least 5 h in a mixed atmosphere of an inert gas and hydrogen under the condition that the temperature of the central temperature zone is maintained at 1050-1070° C., so as to obtain a purified single-crystal copper foil, wherein the assembly is composed of a polycrystalline copper foil containing impurities and a carrier supporting the polycrystalline copper foil, the polycrystalline copper foil is a rolled (Continued)

copper foil, the flow of the inert gas is 500-600 sccm, and the flow of the hydrogen is 30-100 sccm. The purification method can not only directly purify an industrial polycrystalline copper foil and alleviate the problems of an existing purification method being high in terms of energy consumption and high in terms of preparation difficulty, but also convert the industrial polycrystalline copper foil into a single crystal and improve the product performance.

13 Claims, 7 Drawing Sheets

(56) References Cited

FOREIGN PATENT DOCUMENTS

| CN | 112442729 | A |   | 8/2019 |
| --- | --- | --- | --- | --- |
| CN | 211177936 | U | * | 8/2020 |
| CN | 111690982 | A | * | 9/2020 |
| CN | 112522775 | A |   | 11/2020 |
| CN | 112064071 | A |   | 12/2020 |
| CN | 112144116 | A |   | 12/2020 |
| JP | 2015203149 | A |   | 11/2015 |
| JP | 2013237576 | A |   | 5/2016 |

OTHER PUBLICATIONS

English translation of CN 108950684 (originally published Dec. 7, 2018), obtained from PE2E search.*
English translation of CN 109537043 (originally published Mar. 29, 2019), obtained from PE2E search.*
English translation of CN 211177936-U (originally published Aug. 4, 2020, obtained from PE2E search.*
English translation of CN 111690982(originally published Sep. 22, 2020), obtained from PE2E search.*
English translation of CN 112064071 (originally published Dec. 11, 2020), obtained from PE2E search.*
First Office Action issued in parent CN202210357816.4. Dec. 24, 2022.
Second Office Action issued in parent CN202210357816.4. Apr. 5, 2023.
Notification of Grant of parent CN202210357816.4. Jun. 2, 2023.
Search Report issued in parent CN202210357816.4.
English Translation of the Written Opinion issued in PCT/CN2022/111208. Oct. 9, 2022. 3 Pages.
English Translation of the International Search Report issued in PCT/CN2022/111208. Nov. 1, 2022. 3 Pages.
Written Opinion issued in PCT/CN2022/111208. Oct. 9, 2022. 12 Pages.
International Search Report issued in PCT/CN2022/111208. Nov. 1, 2022. 4 Pages.

* cited by examiner

PURIFICATION METHOD FOR COPPER FOIL

CROSS REFERENCE TO RELATED APPLICATIONS

This application is a national stage application under 35 U.S.C. 371 and claims the benefit of PCT Application No. PCT/CN2022/111208, having an international filing date of Aug. 9, 2022, which designated the United States, and which claims priority to Chinese Patent Application No. CN202210357816.4, filed with the Chinese Patent Office on Apr. 6, 2022, and entitled "Purification Method for Copper Foil", the contents of which are incorporated herein by reference in entirety.

TECHNICAL FIELD

The present disclosure relates to the field of material purification, and in particular to a purification method for a copper foil.

BACKGROUND ART

The pursuit of high-purity metals is an urgent need for advanced precision electronic technology development as intrinsic pure metals have excellent physical and chemical properties. In the above, high-purity copper has extremely attractive electrical, thermal, and mechanical properties, and has been widely applied to industrial fields such as modem communications, electronics, and national defense. Improving purity of copper is an effective way to further improve properties of metal products. For example, the electrical conductivity can be increased by nearly 100 times when the purity is improved from 4 N to 7 N at 10 K, and an area reduction rate of 6 N ultra-pure copper after tensile test is 91%, which is higher than 82% of commercial copper.

In order to meet requirements for high-purity copper, people have investigated a series of purification methods, including electrorefining, zone-melting refining, and anion exchange. Due to high-temperature resistance, excellent flexibility and other characteristics, rolled copper foil has become a key material for the most advanced technologies such as 5G printed circuit board (PCB) and negative current collector of lithium ion battery. In the past few years, efforts have been devoted to optimizing the copper purification in the form of zone melting, electrolysis, or anion exchange, while effective methods for refining existing copper foils are rarely reported. At present, the purification technique for conventional copper foil is refining crude copper and then performing a rolling process. However, during the rolling, new contaminants are inevitably introduced into the foil, and even trace impurities have a great impact on the performance of products. Therefore, there is an urgent need to develop a new method for purifying a pristine copper foil without destroying an initial macroscopic structure thereof while simplifying a purifying device.

SUMMARY

The present disclosure provides a purification method for a copper foil, including:
placing an assembly in a central temperature zone of a tubular furnace, and annealing for at least 5 h in a mixed atmosphere of an inert gas and hydrogen under a condition that a temperature of the central temperature zone is maintained at 1050-1070° C., to obtain a purified single-crystal copper foil, wherein
the assembly is composed of a polycrystalline copper foil containing impurities and a carrier supporting the polycrystalline copper foil, the polycrystalline copper foil is a rolled copper foil, a flow rate of the inert gas is 500-600 sccm, and a flow rate of the hydrogen is 30-100 sccm.

In some optional embodiments, the temperature of the central temperature zone is 1050-1065° C.

In some optional embodiments, the annealing lasts for 5-10 h.

In some optional embodiments, the flow rate of the hydrogen is 30-60 sccm, and a ratio of the flow rate of the inert gas to the flow rate of the hydrogen is 10-20:1.

In some optional embodiments, the ratio of the flow rate of the inert gas to the flow rate of the hydrogen is 13-17:1.

In some optional embodiments, the tubular furnace is provided with plugs at two ends, and the purification method for a copper foil includes: removing the plug at at least one end of the tubular furnace before annealing.

Optionally, the purification method for a copper foil includes: removing the plugs at the two ends of the tubular furnace before annealing.

In some optional embodiments, the carrier is graphite paper and a quartz plate supporting the graphite paper, and the polycrystalline copper foil is placed on a side of the graphite paper facing away from the quartz plate.

In some optional embodiments, an impurity content of the graphite paper is not greater than 200 ppm, and purity of the quartz plate is not less than 6 N.

In some optional embodiments, the purification method for a copper foil further includes: after completing the annealing, maintaining the atmosphere in the tubular furnace unchanged and naturally cooling.

In some optional embodiments, the polycrystalline copper foil has a thickness of 3-50 μm.

The present disclosure further provides a purified copper foil obtained through purification by the method according to any one of the above.

In some optional embodiments, purity of the purified copper foil is greater than or equal to 99.99%.

In some optional embodiments, all crystal domain sizes of the purified copper foil are not less than (200×200) μm2.

The present disclosure further provides use of the purified copper foil according to the above in fields of communications, electronics, batteries, and semiconductors.

BRIEF DESCRIPTION OF DRAWINGS

In order to more clearly illustrate technical solutions of examples of the present disclosure, drawings which need to be used in the examples will be introduced briefly below. It should be understood that the drawings below merely show some examples of the present disclosure, and therefore should not be considered as limitation to the scope. Those ordinarily skilled in the art still could obtain other relevant drawings according to these drawings, without using any inventive efforts.

DETAILED DESCRIPTION OF EMBODIMENTS

Figure 1:
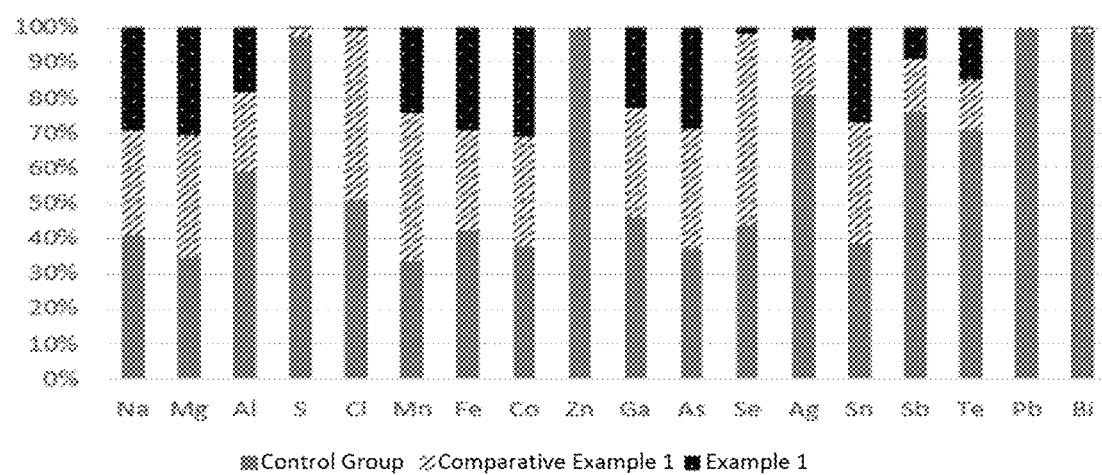
FIG. 1 is a schematic diagram for comparison of impurity contents of copper foils purified in control group, Example 1, and Comparative Example 1.

Embodiments of the present disclosure will be described in detail below in combination with examples, while those skilled in the art would understand that the following examples are merely used for illustrating the present disclosure, but should not be considered as limitation to the scope of the present disclosure. If no specific conditions are specified in the examples, they are carried out under normal conditions or conditions recommended by manufacturers. If manufacturers of reagents or apparatuses used are not specified, they are conventional products commercially available.

A purification method for a copper foil in the examples of the present disclosure is specifically described in the following.

An embodiment of the present disclosure provides a purification method for a copper foil, which include:

S1, obtaining an assembly, wherein the assembly is composed of a polycrystalline copper foil containing impurities and a carrier supporting the polycrystalline copper foil.

Since the purification method provided in the present disclosure is a direct purification technology for the polycrystalline copper foil, in order to achieve a better purification effect, the purified copper foil can be used directly without smelting and rolling. Optionally, the polycrystalline copper foil has a thickness of 3-50 μm, for example, the thickness of the polycrystalline copper foil is 5-45 μm, 8-40 μm, 12-35 μm, or 20-30 μm, such as 3 μm, 5 μm, 10 μm, 15 μm, 20 μm, 25 μm, 30 μm, 40 μm, 45 μm, or 50 μm, as well as interval values between any two endpoints thereof. The polycrystalline copper foil herein may be a commercially available industrial copper foil, and also may be self-prepared, which is not limited herein.

It should be noted that, types and contents of the impurities contained in the polycrystalline copper foil are not specifically limited herein, and the types of the impurities substantially have no influence on the final purification effect.

It should be noted that, the polycrystalline copper foil is a rolled copper foil, and when the polycrystalline copper foil is an electrolytic copper foil, the method provided in the present disclosure cannot be used to perform monocrystallization purification.

The carrier is used to support the polycrystalline copper foil as the polycrystalline copper foil is thin, so as to facilitate subsequent annealing.

In some embodiments, the carrier is made of a high-temperature-resistant material. Optionally, the carrier is graphite paper and a quartz plate supporting the graphite paper. In some embodiments, the copper foil is placed on a side of the graphite paper facing away from the quartz plate.

In some embodiments of the present disclosure, considering that the graphite paper is thin and flexible, and is prone to deformation when carrying the copper foil alone, and surface morphology of a single-crystal copper foil obtained after a subsequent heat treatment is not flat, thus, in the present disclosure, the graphite paper is supported by the quartz plate, to prevent deformation of the graphite paper. Since interaction between the graphite paper and the polycrystalline copper foil is weak at an annealing temperature, by placing the copper foil on the side of the graphite paper facing away from the quartz plate, an external stress on the copper foil generated by the carrier due to the interaction between the two during the annealing process can be reduced, then the single-crystal copper foil itself is further maintained to be flat, and an obtained product can be directly applied to industry without subsequent processing, which effectively saves energy. Moreover, the graphite paper, having good thermal conductivity, can implement uniform gradient annealing, which is beneficial to improve the purification effect.

Optionally, a thickness of the graphite paper is ≤1.5 mm, for example, the thickness of the graphite paper is, for example, 10-1.5 mm, 20-1.0 mm, 50-900 μm or 100-500 μm, such as 10 μm, 20 μm, 25 μm, 30 μm, 40 μm, 50 μm, 60 μm, 70 μm, 100 μm, 200 μm, 300 μm, 500 μm, 600 μm, 800 μm, 1.0 mm, 1.5 mm, as well as interval values between any two endpoints thereof.

Optionally, an impurity content of the graphite paper is not greater than 200 ppm, and purity of the quartz plate is not less than 6 N. For example, the impurity content of the graphite paper is not greater than, for example, 180 ppm, 160 ppm, 140 ppm, 120 ppm, or 100 ppm, as well as interval values between any two endpoints thereof. For example, the purity of the quartz plate is not less than, for example, 6.3 N, 6.5 N, 6.8 N, 7.0 N, 7.3 N, 7.5 N, 7.8 N, 8.0 N, as well as interval values between any two endpoints thereof.

Optionally, before formal use as the carrier for purifying the copper foil, the graphite paper has been calcined for 200 times or more at a high temperature of 1000° C., in this way, the impurity content of the graphite paper can be lowered, so that contamination brought about by the graphite paper can be reduced in the process of purifying the copper foil.

It is believed that, without being bound by theory, the use of high-purity graphite paper and high-purity quartz plate prevents, during the annealing, impurities contained in the carrier from diffusing or depositing onto the copper foil to affect the purity of the copper foil.

S2, placing the assembly in a central temperature zone of a tubular furnace, and annealing for at least 5 h in a mixed atmosphere of an inert gas and hydrogen under a condition that a temperature of the central temperature zone is maintained at 1050-1070° C., to obtain a purified single-crystal copper foil.

It should be noted that, placing the assembly in the central temperature zone of the tubular furnace may be carried out in such a way that first the carrier is placed in the tubular furnace, and then the polycrystalline copper foil is placed on the carrier located in the tubular furnace, or in such a way that the polycrystalline copper foil is placed on the carrier, and the polycrystalline copper foil and the carrier are together placed in the tubular furnace. The latter is easy to operate and is less difficult, and facilitates flat placement for the polycrystalline copper foil.

It is believed that, without being bound by theory, the central temperature zone of the tubular furnace is a constant-temperature zone, and however, due to the limitations of tubular furnace structure and the mode of non-heating at two ends, the temperature in the tubular furnace gradually decreases in a gradient from the central temperature zone of furnace zone to the two ends. Thus, in the mixed atmosphere of the inert gas and hydrogen, the annealing carried out with the temperature of the central temperature zone of the tubular furnace being maintained at 1050-1070° C. is actually gradient annealing. The above high-temperature atmosphere makes the impurities have a high saturated vapor pressure and a low equilibrium segregation coefficient. Moreover, a temperature gradient in a central thermal zone provides a driving force for continuous movement of grain boundaries on a surface of the copper, thereby pushing the impurities to move towards the grain boundaries, and activated hydrogen also reacts with some non-metal impurities to form compounds which fly away with the airflow, thereby effectively purifying the copper foil, reducing the impurity content thereof, and realizing the purification of a two-dimensional copper foil since what is obtained is also a copper foil. In addition, with use of the above purification method for a copper foil, an industrial two-dimensional polycrystalline copper foil can be directly converted into a two-dimensional single-crystal copper foil, thereby further improving electrical performance of a finally purified product. Meanwhile, the inventors of the present disclosure surprisingly found that the annealing carried out in the above range can effectively improve flatness of the surface of the copper foil, effectively ensure growth of grain size, and meet the requirement that all crystal domain sizes of the purified copper foil are not less than (200×200) μm2. As illustrated by the following comparative examples, if the temperature is too low, the growth of the grain size of the copper foil is limited, the grain domain size in the present disclosure is not met, and the surface of the purified copper foil is uneven; and if the temperature is too high, it is close to the melting point of copper, then after the annealing with temperature difference, copper particles are formed, and the form of copper foil no longer exists.

It should be noted that, the single-crystal copper foil obtained by this method has no grain boundary in the range of from (200×200) μm2 to (250×300) μm2, and all the crystal domain sizes are not less than (200× 200) μm2, i.e., there is only a unique crystal domain, and the crystal domain size is not less than (200×200) μm2.

In the above, the annealing is carried out for at least 5 h at the temperature of 1050-1070° C. in the central temperature zone of the tubular furnace, for example, the annealing is carried out for at least 5 h when the temperature in the central temperature zone is, for example, 1053-1065° C., 1055-1063° C., 1058-1060° C. or 1050-1063° C., such as 1050° C., 1051° C., 1052° C., 1053° C., 1054° C., 1055° C., 1056° C., 1057° C., 1058° C., 1059° C., 1060° C., 1061° C., 1062° C., 1063° C., 1064° C., 1065° C., 1066° C., 1067° C., 1068° C., 1069° C., or 1070° C., as well as interval values between any two endpoints thereof. Within such ranges of annealing temperature and annealing time, the polycrystalline copper foil is effectively purified and converted into the single-crystal copper foil. With the temperature in the central temperature zone of the tubular furnace being within the range of 1050-1070° C., the impurity content can be effectively reduced, and meanwhile, it avoids an actual high temperature in the central temperature zone due to inaccurate temperature control and other reasons when the temperature in the tubular furnace is too high, and the polycrystalline copper foil is prevented from tending to melt to change the macroscopic two-dimensional structure thereof, thus effectively implementing direct purification of the two-dimensional polycrystalline copper foil into the two-dimensional single-crystal copper foil. If the temperature is lower than 1050° C. or the annealing time is less than 5 h, the crystal domain size cannot be effectively increased and the impurity content cannot be reduced. If the temperature is higher than 1070° C., although the impurities can be removed, the actual temperature in the central temperature zone of the furnace zone is higher due to inaccurate temperature control in the tubular furnace and other reasons, resulting in the polycrystalline copper foil tends to melt to change the macroscopic two-dimensional structure thereof, it is thus impossible to implement direct purification from the two-dimensional polycrystalline copper foil to the two-dimensional single-crystalline copper foil.

Optionally, the temperature of the central temperature zone is 1050-1065° C. In this range, direct purification of the two-dimensional polycrystalline copper foil into the two-dimensional single-crystal copper foil is effectively implemented.

Optionally, the annealing time is 5-10 h, for example, the annealing time is 5.5-9.5 h, 6-9 h, 6.5-8.5 h or 5-6 h, such as 5 h, 6 h, 7 h, 8 h, 9 h or 10 h, as well as interval values between any two endpoints thereof. In the above annealing time ranges, the impurities are effectively removed, and meanwhile, the energy consumption can be effectively reduced compared with too long annealing time. Optionally, a flow rate of the inert gas is 500-600 sccm, for example, the flow rate of the inert gas is 510-590 sccm, 520-580 sccm or 530-570 sccm, such as 500 sccm, 520 sccm, 530 sccm, 550 sccm, 560 sccm, 570 sccm or 600 sccm, as well as interval values between any two endpoints thereof. Optionally, a flow rate of the hydrogen is 30-100 sccm, for example, the flow rate of the hydrogen is 30-60 sccm, 30-70 sccm, or 60-100 sccm, such as 30 sccm, 32 sccm, 34 sccm, 35 sccm, 36 sccm, 38 sccm, 40 sccm, 42 sccm, 45 sccm, 46 sccm, 48 sccm, 50 sccm, 55 sccm, 60 sccm, 65 sccm, 70 sccm, 75 sccm, 80 sccm, 85 sccm, 90 sccm, 95 sccm, or 100 sccm, as well as interval values between any two endpoints thereof.

In the above, the inert gas includes at least one of argon and nitrogen, wherein in order to avoid introduction of impurities, the inert gas and the hydrogen both should be high-purity gases with purity greater than 99.999%.

During actual preparation, the applicant found that although the purification effect can be effectively improved with the above specific annealing temperature and time, however, the finally purified single-crystal copper foil still has some impurities and has a rough surface. In this regard, upon further researches, it was found that the reason for the surface roughness lies in, on one hand, influence of the mixed atmosphere, and on the other hand, removable plugs at two ends of the tubular furnace. The plugs can ensure as balanced temperature as possible in a furnace cavity, thereby reducing a temperature difference between the copper foil located in the middle of the furnace cavity and the copper foil located at the two ends of the furnace cavity to a certain extent. However, due to the high annealing temperature, the impurities in the plugs are gasified and deposited on the surface of the final single-crystal copper foil during the actual annealing, and as a result, the surface of the finally purified single-crystal copper foil is rough and the impurity content is high.

Therefore, in order to further improve the purification effect of the polycrystalline copper foil and meanwhile flatten the surface of the single-crystal copper foil obtained by purification, optionally, the flow rate of the hydrogen is 30-60 sccm, for example, 30-55 sccm, 30-50 sccm, 30-45 sccm, 30-40 sccm, 35-55 sccm, 38-52 sccm or 30-50 sccm. In some optional embodiments, a ratio of the flow rate of the inert gas to the flow rate of the hydrogen is 10-20:1, for example, the ratio of the flow rate of the inert gas to the flow rate of the hydrogen is 12-18:1, 13-17:1, or 14-16:1, such as 10:1, 11:1, 13:1, 14:1, 15:1, 16:1, 17:1, 18:1, 19:1, or 20:1, as well as interval values between any two endpoints thereof. Optionally, the ratio of the flow rate of the inert gas to the flow rate of the hydrogen is 13-17:1.

The inventors of the present disclosure surprisingly found that, under the foregoing conditions, by making a hydrogen content lower than that of the inert gas by a certain proportional range, the polycrystalline copper foil can be effectively purified and the crystal domain sizes can also be effectively increased, thus ensuring that all single-crystal domain sizes of the single-crystal copper foil are not less than (200×200) µm2, and making the surface of the purified copper foil smooth. As illustrated through the comparative examples below, if the hydrogen is in a small amount, the crystal domain sizes of the purified copper foil are small, the purity is low, and uneven cavities are present on the surface, and if the hydrogen is in a too large amount, although a high-purity copper foil can be obtained, the purified single-crystal copper foil has uneven cavities on the surface, which increases the surface roughness.

Optionally, the tubular furnace is provided with the plugs at two ends, and the purification method for a copper foil includes: removing the plug at at least one end of the tubular furnace before annealing.

By means of the above configuration, the purification effect of the purification method for a copper foil can be improved, and meanwhile the surface of the purified copper foil is flattened.

In order to further improve the purification effect of the purification method for a copper foil, and meanwhile flatten the surface of the single-crystal copper foil obtained by purification, optionally, the tubular furnace is provided with the plugs at two ends, and the purification method for a copper foil includes: removing the plugs at the two ends of the tubular furnace before annealing. As can be seen from conventional technology in the art, the plugs function to reduce conduction between a central heating zone and external cold air, and prolong period of temperature gradient at an interface. However, the inventors unexpectedly found that during the purification of the copper foil, if the plugs are not added to two ends of the tubular furnace (i.e., the plugs at the two ends of the tubular furnace are removed before annealing), it can effectively prevent a high-temperature airflow at an inlet end from driving the impurities in the plugs to contact the surface of the copper foil, thus, interface stability of pure substance (copper) is effectively improved, and a local temperature difference and a local curvature difference at the interface are avoided, so that the temperature gradient at the interface of the copper foil is not disturbed, thereby further improving the flatness of the surface of the copper foil.

In some examples, the plugs include, but not limited to, quartz plugs.

S3, after completing the annealing, maintaining the atmosphere in the tubular furnace unchanged and naturally cooling.

When cooling, the atmosphere in the tubular furnace is unchanged, and stability of the condition is maintained, so as to avoid change of the single-crystal copper foil caused by atmosphere change during the cooling. By the expression "the atmosphere in the tubular furnace is unchanged", it means that the atmosphere during the cooling and types and flow rates of various gases during the annealing are the same.

In some embodiments, in step S3, the atmosphere in the tubular furnace is maintained unchanged and the tubular furnace is naturally cooled to a room temperature.

In some embodiments, the room temperature is 20-25° C.

An embodiment of the present disclosure provides a purified copper foil purified by the above method.

Optionally, purity of the purified copper foil is greater than or equal to 99.99%.

Optionally, all crystal domain sizes of the purified copper foil are not less than (200×200) µm2.

An embodiment of the present disclosure provides use of a purified copper foil in fields of communications, electronics, batteries, and semiconductors.

The purification method for a copper foil provided in the present disclosure can directly purify the industrial polycrystalline rolled copper foil, and alleviate the problems of high energy consumption and high preparation difficulty of the existing purification method, and meanwhile can monocrystallize the industrial polycrystalline copper foil and improve the product performance.

EXAMPLES

The purification method for a copper foil in the present disclosure is further described in detail below in combination with examples.

In the following examples and comparative examples, the polycrystalline copper foils were all from the same lot of polycrystalline rolled copper foils produced by the same manufacturer.

Example 1

High-purity graphite paper (with an impurity content of 200 ppm) was placed on a high-purity quartz plate (6 N), and a polycrystalline copper foil (a commercial polycrystalline copper foil, with purity of 99.0%) with a thickness of 25 μm was placed on the high-purity graphite paper, to obtain polycrystalline copper foil/high-purity graphite paper/high-purity quartz plate.

The polycrystalline copper foil/high-purity graphite paper/high-purity quartz plate was placed into a central temperature region of a tubular furnace. Plugs were not added to two ends of the tubular furnace. Argon and hydrogen were introduced into the tubular furnace. Annealing was carried out for 5 h in an atmosphere where a flow rate of the argon was 600 sccm and a flow rate of the hydrogen was 38 sccm, and a temperature of the central temperature zone of the tubular furnace was maintained at 1065° C. After the annealing ended, the tubular furnace was naturally cooled to a room temperature in an atmosphere where the flow rate of the argon was kept at 600 sccm, and the flow rate of the hydrogen was kept at 38 sccm.

Example 2

High-purity graphite paper (with an impurity content of 200 ppm) was placed on a high-purity quartz plate (6 N), and a polycrystalline copper foil (a commercial polycrystalline copper foil, with purity of 99.0%) with a thickness of 25 μm was placed on the high-purity graphite paper, to obtain polycrystalline copper foil/high-purity graphite paper/high-purity quartz plate.

The polycrystalline copper foil/high-purity graphite paper/high-purity quartz plate was placed into a central temperature region of a tubular furnace. Plugs were not added to two ends of the tubular furnace. Argon and hydrogen were introduced into the tubular furnace. Annealing was carried out for 5 h in an atmosphere where a flow rate of the argon was 600 sccm and a flow rate of the hydrogen was 30 sccm, and a temperature of the central temperature zone of the tubular furnace was maintained at 1050° C. After the annealing ended, the tubular furnace was naturally cooled to a room temperature in an atmosphere where the flow rate of the argon was kept at 600 sccm, and the flow rate of the hydrogen was kept at 30 sccm.

Example 3

High-purity graphite paper (with an impurity content of 200 ppm) was placed on a high-purity quartz plate (6 N), and a polycrystalline copper foil (a commercial polycrystalline copper foil, with purity of 99.0%) with a thickness of 25 μm was placed on the high-purity graphite paper, to obtain polycrystalline copper foil/high-purity graphite paper/high-purity quartz plate.

The polycrystalline copper foil/high-purity graphite paper/high-purity quartz plate was placed into a central temperature region of a tubular furnace. Plugs were not added to two ends of the tubular furnace. Argon and hydrogen were introduced into the tubular furnace. Annealing was carried out for 6 h in an atmosphere where a flow rate of the argon was 600 sccm and a flow rate of the hydrogen was 40 sccm, and a temperature of the central temperature zone of the tubular furnace was maintained at 1070° C. After the annealing ended, the tubular furnace was naturally cooled to a room temperature in an atmosphere where the flow rate of the argon was kept at 600 sccm, and the flow rate of the hydrogen was kept at 40 sccm.

Example 4

Example 4 is merely different from Example 1 in that the flow rate of the hydrogen was 30 sccm.

Example 5

Example 5 is merely different from Example 1 in that the flow rate of the argon was 600 sccm, and the flow rate of the hydrogen was 60 sccm.

Example 6

Example 6 is merely different from Example 1 in that the flow rate of the hydrogen was 100 sccm.

Example 7

Example 7 is merely different from Example 1 in that the annealing was carried out for 5 h with the temperature of the central temperature zone of the tubular furnace being maintained at 1050° C.

Example 8

Example 8 is merely different from Example 1 in that the annealing was carried out for 5 h with the temperature of the central temperature zone of the tubular furnace being maintained at 1070° C.

Comparative Example 1

Comparative Example 1 is merely different from Example 1 in that the annealing was carried out for 4 h with the temperature of the central temperature zone of the tubular furnace being maintained at 1065° C.

Comparative Example 2

Comparative Example 2 is merely different from Example 1 in that two ends of the tubular furnace were both added with the plugs.

Comparative Example 3

Comparative Example 3 is merely different from Example 1 in that the temperature of the central temperature zone of the tubular furnace was maintained at 1045° C.

It was found during practical preparation that the rolled copper foil cannot be monocrystallized at the temperature of 1045° C., and cannot be purified by the monocrystallization purification method in the present disclosure.

Comparative Example 4

Comparative Example 4 is merely different from Example 1 in that the flow rate of the hydrogen was 15 sccm.

Comparative Example 5

Comparative Example 5 is merely different from Example 1 in that the temperature of the central temperature zone of the tubular furnace was maintained at 1075° C.

TEST EXAMPLES (I) Impurity Content Determination

Taking a polycrystalline rolled copper foil as a control group, surfaces of copper foil test samples of the control group and Example 1, Example 7, and Comparative Example 1 were respectively cleaned with deionized-water-diluted high-purity nitric acid (Alfa, 70%, ≥99.999% metalbased), electronic hydrochloric acid (≥99.99%), and deionized water, and then tested for an impurity content by glow discharge mass spectroscopy. Results are shown in Table 1.

TABLE 1

Impurity Content Determination (in ppm)

| Element | Control Group | Example 1 | Example 7 | Comparative Example 1 |
|---|---|---|---|---|
| Na | 0.007 | 0.005 | 0.005 | 0.005 |
| Mg | 0.08 | 0.07 | 0.08 | 0.08 |
| Al | 0.16 | 0.05 | 0.06 | 0.06 |
| S | 9 | 0.008 | 0.009 | 0.24 |
| Cl | 3.4 | 0.06 | 0.07 | 3.2 |
| Mn | 0.25 | 0.18 | 0.19 | 0.31 |
| Fe | 48 | 33 | 33 | 32 |
| Co | 0.23 | 0.19 | 0.19 | 0.19 |
| Zn | 20 | 0.01 | 0.01 | 0.01 |
| Ga | 0.12 | 0.06 | 0.07 | 0.08 |
| As | 1.4 | 1.1 | 1.1 | 1.3 |
| Se | 0.24 | 0.01 | 0.01 | 0.3 |
| Ag | 20 | 0.87 | 2 | 3.8 |
| Sn | 5 | 3.5 | 3.4 | 4.4 |
| Sb | 0.61 | 0.07 | 0.08 | 0.12 |
| Te | 0.24 | 0.05 | 0.05 | 0.05 |
| Pb | 1.8 | 0.001 | 0.001 | 0.002 |
| Bi | 0.31 | 0.001 | 0.001 | 0.003 |

As can be seen from Table 1, the impurity contents in Example 1 and Example 7 are both reduced more obviously compared with that of Comparative Example 1, and the purification effect of Example 1 is superior to that of Comparative Example 1.

Taking a total impurity content of various impurities corresponding to the copper foils purified in the control group, Example 1, and Comparative Example 1 to be 100%, the impurity contents of the copper foils purified in the control group, Example 1, and Comparative Example 1 are compared. Results are shown in FIG. 1. It can be apparently seen from FIG. 1 that the impurity content in Example 1 is lower than that in Comparative Example 1.

Figure 2:
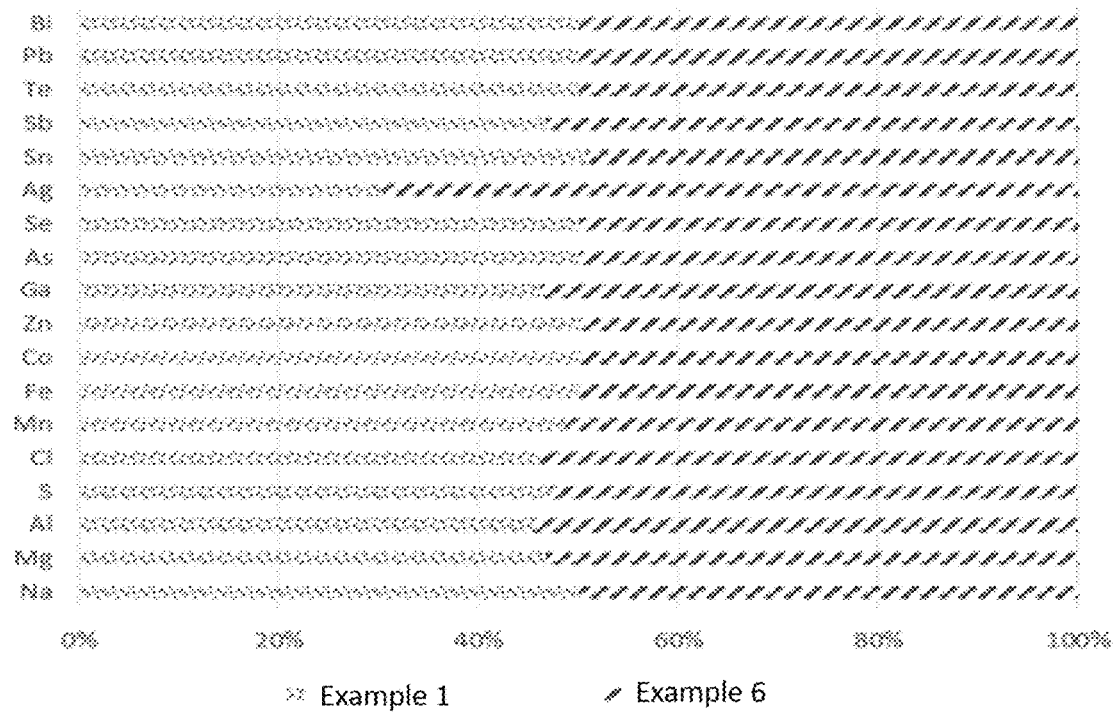
FIG. 2 is a schematic diagram for comparison of impurity contents of copper foils purified in Example 1 and Example 7.

Taking a total impurity content of various impurities corresponding to the copper foils purified in Example 1 and Example 7 to be 100%, the impurity contents of the copper foils purified in Example 1 and Example 7 are compared. Results are shown in FIG. 2. It can be seen from FIG. 2 that the impurity content in Example 1 is further lowered than that in Example 7.

It should be noted that, the contents of various impurities of the copper foils purified in Examples 2-5 of the present disclosure are all significantly lower than that in Comparative Example 1.

(II) Characterization of Material Surface Topography (1) The surface morphologies of materials were characterized using an Olympus (BX53M) microscope at a magnification of 20×.

Figure 3:
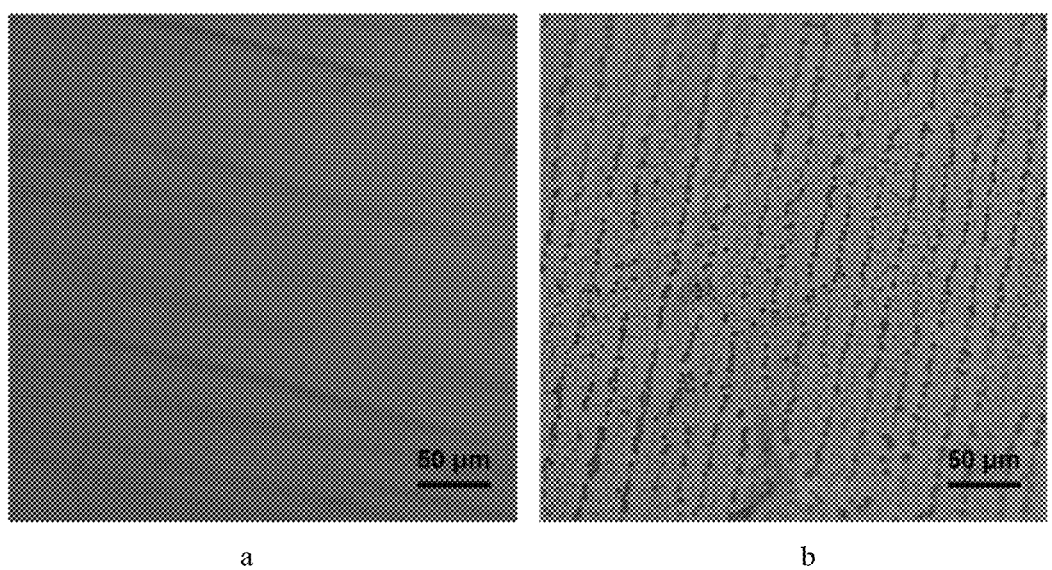
FIG. 3 is a diagram for comparison of surface morphologies of single-crystal copper foils prepared in Example 1 and Comparative Example 2, wherein a is for Example 1, and b is for Comparative Example 2.

(a) Referring to FIG. 3, FIG. 3 is a diagram for comparison of surface morphologies of the single-crystal copper foils prepared in Example 1 and Comparative Example 2, wherein the scale is 50 μm, FIG. 3a is a photograph of the surface morphology of the copper foil purified in Example 1, and FIG. 3b is a photograph of the surface morphology of the copper foil purified in Comparative Example 2. As can be seen from FIG. 3, the surface is flat in FIG. 3a, and the surface has obvious cavities in FIG. 3b, and the surface is not flat. During experiment, the plugs (made of quartz) function to reduce conduction between a central heating zone and external cold air, and prolong period of temperature gradient at an interface. However, the inventors unexpectedly found that during the purification, if the plugs were not added to two ends of the tubular furnace, it can effectively prevent a high-temperature airflow at an inlet end from driving the impurities in the plugs to contact the surface of the copper foil, thus, interface stability of pure substance (copper) is effectively improved, and a local temperature difference and a local curvature difference at the interface are avoided, so that the temperature gradient at the interface of the copper foil is not disturbed, thereby further effectively improving the flatness of the surface of the copper foil, and reducing the roughness of the surface of the copper foil.

Figure 12:
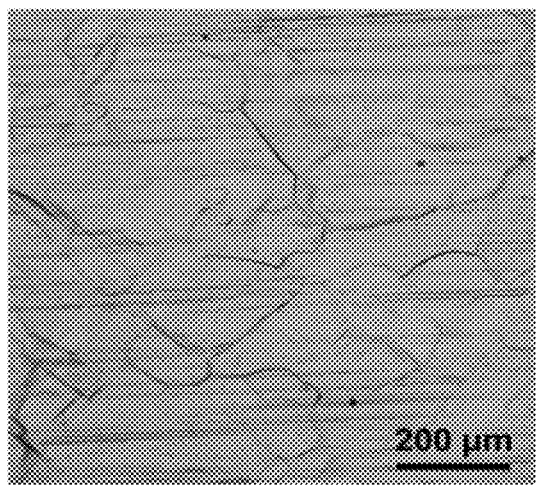
FIG. 12 is a photograph of surface morphology of the single-crystal copper foil prepared in Comparative Example 4.

(b) With reference to FIGS. 3a, 6 to 8, and FIG. 12, FIGS. 3a, 6, 7, and 8 are respectively corresponding to photographs of surface morphologies of the single-crystal copper foils prepared in Example 1 and Examples 4, 5, and 6 of the present disclosure, from which it can be seen that the surfaces thereof are relatively flat; and the roughness of the surfaces of the copper foils is relatively low; FIG. 12 is a photograph of surface morphology of the single-crystal copper foil prepared in Comparative Example 4, in which grain boundaries appear, a single-crystal copper foil with a larger crystal domain size cannot be obtained, the surface is not flat, and with high roughness across the grain boundaries. Therefore, the inventors of the present disclosure unexpectedly found that the flow rate of hydrogen affects the crystal domain sizes of the monocrystallized copper foil and the surface roughness after purification. In the above monocrystallization copper purification method in the present disclosure, impurities inside the copper can be effectively replaced by controlling the flow rate of the hydrogen in the inert atmosphere to be in the range of 30~100 sccm, thus effectively increasing the crystal domain sizes, ensuring that all single-crystal domain sizes of the single-crystal copper foil are not less than (200×200) μm2, and meanwhile, effectively ensuring the flatness of the surface of the purified copper foil and effectively reducing the roughness of the surface of the copper foil. When the flow rate of the hydrogen is too low (for example, lower than 30 sccm), the reducing property of the hydrogen is not enough to effectively replace the impurities inside the copper, or effectively increase the crystal domain size. If the hydrogen content is too high (for example, the flow rate of the hydrogen is greater than 100 sccm), the surface is enriched with copper slags and tiny pits, thereby increasing the surface roughness. In addition, when the flow rate of the hydrogen is controlled within the range of 30~60 sccm, the content of copper slags can be further reduced, so that the single-crystal domain size of not less than (200×200) μm2 can be satisfied, and the flatness of the surface of the purified copper foil is further improved, and the roughness of the surface of the copper foil is further effectively reduced.

Figure 9:
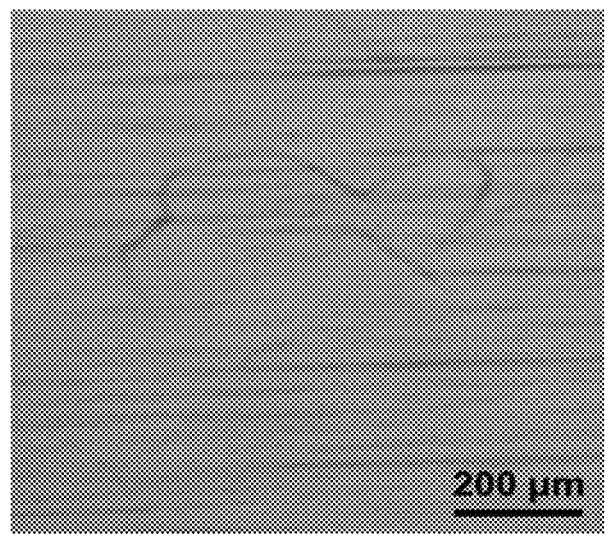
FIG. 9 is a photograph of surface morphology of the single-crystal copper foil prepared in Example 7.
Figure 10:
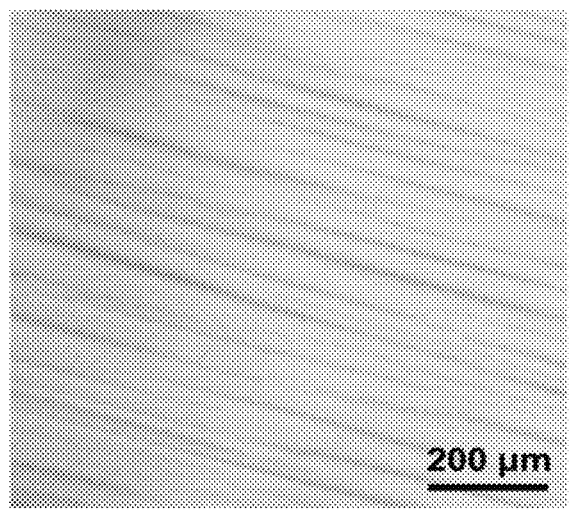
FIG. 10 is a photograph of surface morphology of a single-crystal copper foil prepared in Example 8.
Figure 11:
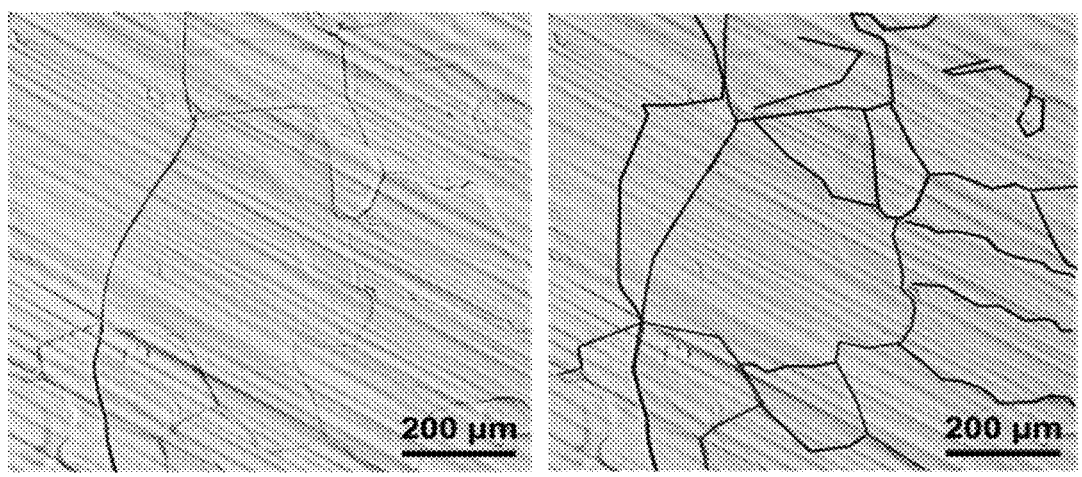
FIG. 11 is a photograph of surface morphology of a single-crystal copper foil, wherein a is a photograph of surface morphology of a single-crystal copper foil prepared in Comparative Example 3; b is for marking grain boundaries present in a (black solid-line marking)

(c) With reference to FIGS. 9, 10, and 11, FIGS. 9 and 10 are respectively corresponding to photographs of surface morphologies of the single-crystal copper foils prepared in Examples 7 and 8, from which it can be apparently seen that the surfaces thereof are relatively flat; and FIG. 11 is a photograph of surface morphology of the single-crystal copper foil prepared in Comparative Example 3, from which it can be seen that grain boundaries appear, some crystal domain sizes are less than 200×200 μm2. Moreover, the surfaces have obvious indentations, with high roughness across the grain boundaries. Meanwhile, the purified copper prepared in Comparative Example 5 is no longer of a two-dimensional planar structure consistent with the pristine copper foil, because copper atoms melt at a higher temperature, and when the temperature is lowered, the melted copper atoms accumulate, and finally form a cluster spherical structure (not shown in the drawings).

The annealing temperature affects size of recrystallization grains of the copper foil. The higher the current temperature of the rolled copper foil after rolling is, the higher the subsequent recrystallization temperature of the copper is, and the larger the grain size is after the recrystallization. By controlling the temperature of the central temperature region to the range of between 1050° C. and 1070° C. (annealing in this condition) in the present disclosure, the grain size growth can be effectively ensured, and it can satisfy that all crystal domain sizes of the purified copper foil are not less than (200×200) μm2, and meanwhile the surface of the purified copper foil is ensured to be flat, and the roughness of the surface of the copper foil is effectively reduced. If the temperature is too low, the grain size growth of the copper foil is restricted, the grain domain size in the present disclosure is not met, and the surface of the purified copper foil is uneven; and if the temperature is too high, it is close to the melting point of copper, then after the annealing with temperature difference, copper particles are formed, and the form of copper foil no longer exists (see Comparative Example 5 for details)

(2) The surface morphologies of the materials were characterized by probe scanning using Oxford Instrument Cypher ES atomic force microscope.

Figure 4:
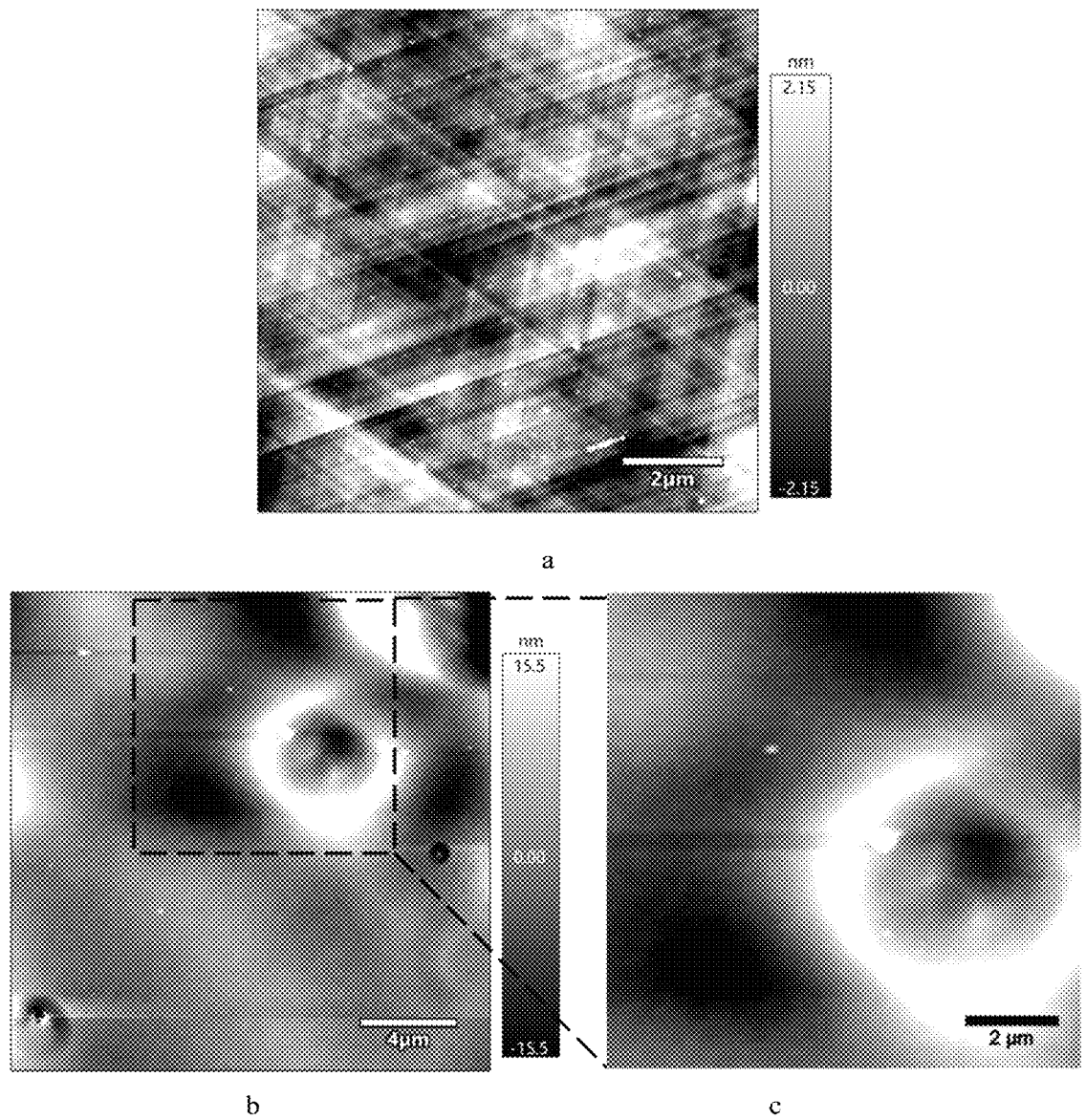
FIG. 4 is a diagram for comparison of surface roughness conditions of the single-crystal copper foils prepared in Example 1 and Comparative Example 2, wherein a is for Example 1 (2 μm scale), b is for Comparative Example 2 (4 μm scale), and c is for Comparative Example 2 (2 μm scale)

FIG. 4 is a diagram for comparison of surface roughness conditions of the single-crystal copper foils prepared in Example 1 and Comparative Example 2 obtained by the atomic force microscope, wherein FIG. 4a is a diagram for surface roughness conditions of the copper foil purified in Example 1, FIGS. 4b and 4c are diagrams for surface roughness conditions of the copper foil purified in Comparative Example 2. As can be seen from FIG. 4, the single-crystal copper foil prepared in Example 1 has no pits on surface, and the single-crystal copper foil prepared in Comparative Example 2 has pits on surface, thus the surface roughness of the single-crystal copper foil prepared in Comparative Example 2 is higher than that of the single-crystal copper foil prepared in Example 1.

(3) The surface morphologies of the copper foils after monocrystallization purification were characterized using an Olympus (BX53M) metallographic microscope under magnifications of 5× and 10×, and meanwhile, the crystal domain sizes of the copper foils were quantitatively described (see Table 3 for detailed crystal domain size data).

Figure 13:
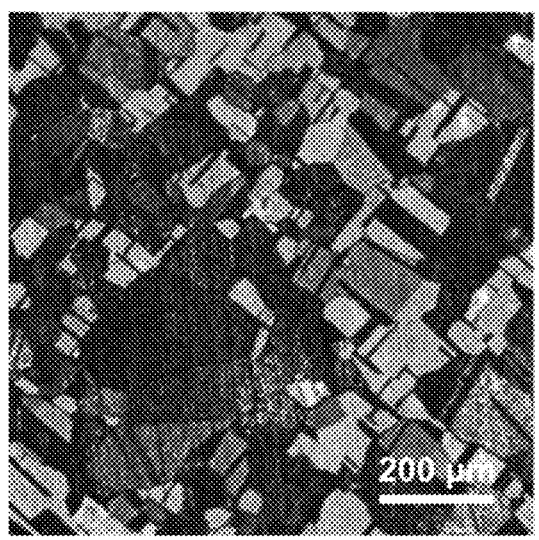
FIG. 13 is a photograph of surface morphology of a pristine polycrystalline copper foil before preparation.

FIG. 13 shows a pristine polycrystalline copper foil used before purification in the examples and comparative examples, which has a small crystal domain size (40*40 μm2 proportion is greater than 90%), and is irregularly distributed.

Figure 5:
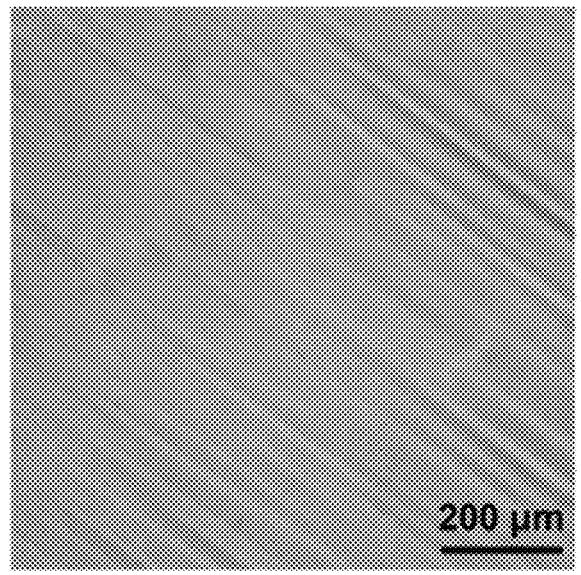
FIG. 5 is a photograph of surface morphology of the single-crystal copper foil prepared in Example 1.
Figure 6:
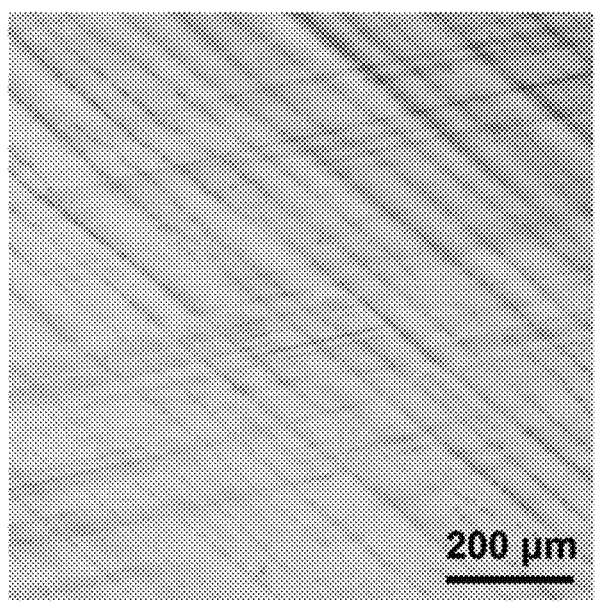
FIG. 6 is a photograph of surface morphology of a single-crystal copper foil prepared in Example 4.
Figure 7:
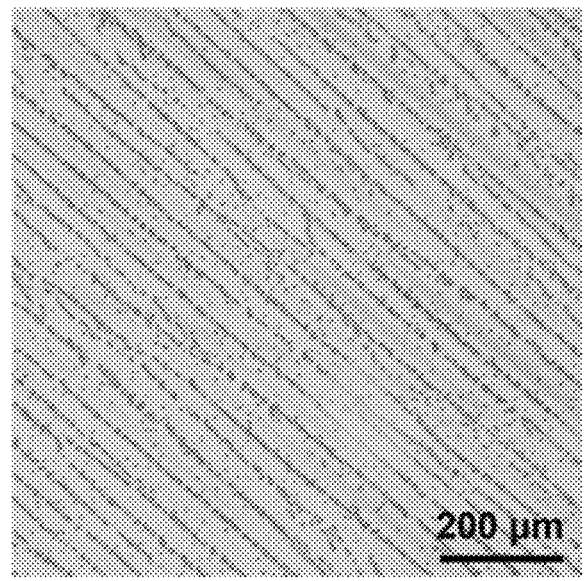
FIG. 7 is a photograph of surface morphology of a single-crystal copper foil prepared in Example 5.
Figure 8:
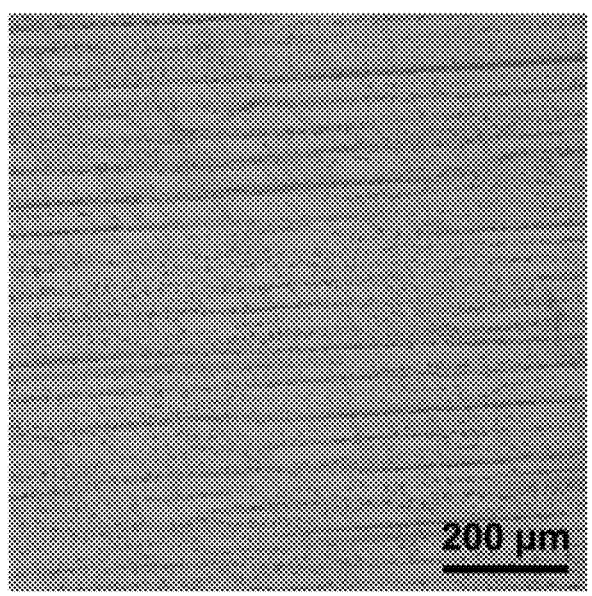
FIG. 8 is a photograph of surface morphology of a single-crystal copper foil prepared in Example 6.

FIG. 5 is a photograph of surface morphology of the single-crystal copper foil prepared in Example 1. FIG. 6 is a photograph of surface morphology of the single-crystal copper foil prepared in Example 4. FIG. 7 is a photograph of surface morphology of the single-crystal copper foil prepared in Example 5. FIGS. 8, 9, and 10 show photographs respectively corresponding to the surface morphologies of the single-crystal copper foils prepared in Examples 6, 7, and 8. Scales in FIG. 5 to FIG. 10 are all 200 μm. According to FIGS. 5 to 10, a relatively smooth single-crystal copper foil surface with a high crystal domain size can be obtained. Meanwhile, as can be seen from comparison between FIG. 5, FIG. 6, and FIG. 7, the surface of the copper foil purified in Example 1 has no impurity spots, and meanwhile the surface roughness is obviously further reduced, compared with Example 4 and Example 5.

(III) Product Property Test

A polycrystalline copper foil was used as a control group. The polycrystalline copper foil in the control group and various single-crystal copper foils purified in Example 1, Example 7, and Comparative Example 1 were respectively stuck with an ultraviolet light (UV) film as samples, and then the samples were subjected to spin-coating of the protective liquid. After 355 nm laser cutting, the protective liquid was removed with deionized water (18.25 MΩ·cm), the samples were irradiated by an ultraviolet lamp for 200 s to remove viscosity of the ultraviolet films, and the ultraviolet films were removed, to obtain semi-finished product samples. The semi-finished product samples were cleaned with deionized water and nitrogen, and a surface oxide layer was removed with hydrogen (50 sccm) at 200° C., to obtain copper foil test samples corresponding to Example 1, Example 7, and Comparative Example 1.

Various copper foils were subjected to a nano-indentation experiment (test standard GB/T 22458-2008) and various copper foil test samples were subjected to mechanical stretching (test standard GB/T 228.1-2010), where a tensile rate was 0.05 mm/min. Test results of various copper foil test samples are shown in Table 2.

TABLE 2

Results of Product Property Test

| | Elasticity Modulus (GPa) | Hardness (HV) | Stretch Rate (%) |
|---|---|---|---|
| Example 1 | 4.51 | 0.74 | 70 |
| Example 7 | 4.63 | 1.67 | 62 |
| Comparative Example 1 | 4.91 | 2.04 | 58 |

As can be seen from Table 2, the stretch rate of the copper foil purified in Example 1 is obviously superior to those in the other two groups.

(IV) Determination of Product Purity and Crystal Domain Size

The copper foil products purified in the above examples and comparative examples were subjected to the following tests, to characterize the products.

(1) Purity of the purified copper foils was tested by a method as follows:

testing the purity of the products by the glow discharge mass spectroscopy (GDMS) (the instrument is suitable for testing trace and ultratrace impurity elements in metals).

The purified copper foils prepared in the present disclosure were pretreated first before the test as they were relatively thin: using blocky 7 N (99.99999%) high-purity indium (In) as an auxiliary material, bonding the copper foils with the indium, and then testing the purity thereof by GDMS.

(2) The crystal domain size was tested by a method as follows:

referring to (3) in (II) Characterization of Material Surface Topography in the above for details, quantitatively describing the crystal domain sizes of the copper foils, while characterizing the surface morphologies of the copper foils having undergone monocrystallization purification with the use of Olympus (BX53M) Metallographic Microscope (see Table 3 for detailed crystal domain size data).

(3) The surface roughness of the copper foils was tested by a method as follows:

observing morphological characteristics of the materials at a high magnification using a laser confocal microscope (VK-X1100), and accurately measuring the surface roughness of the copper foils.

TABLE 3

Characterization Results of Products

|  | Purity of Purified Copper Foil | Smallest Crystal Domain Size ($\mu m^2$) | Surface Roughness Rz ($\mu m$) |
|---|---|---|---|
| Example 1 | 4N8 (99.998%) | 200 × 200 | 0.06 |
| Example 2 | 4N6~4N8 (99.996%~99.998%) | 200 × 200 | 0.08 |
| Example 3 | 4N3~4N6 (99.993%~99.996%) | 200 × 200 | 0.10 |
| Example 4 | 4N3~4N6 (99.993%~99.996%) | 200 × 200 | 0.11 |
| Example 5 | 4N6~4N8 (99.996%~99.998%) | 200 × 200 | 0.47 |
| Example 6 | 4N6~4N8 (99.996%~99.998%) | 200 × 200 | 0.73 |
| Example 7 | 4N3~4N6 (99.993%~99.996%) | 200 × 200 | 0.07 |
| Example 8 | 4N3~4N6 (99.993%~99.996%) | 200 × 200 | 0.09 |
| Comparative Example 1 | 4N3~4N6 (99.993%~99.996%) | 200 × 200 | 1.0 |
| Comparative Example 2 | 3N~3N5 (99.90%~99.95%) | 200 × 200 | 2.5 |
| Comparative Example 3 | 3N2~3N8 (99.92%~99.98%) | 100 × 100 | 4.32 (across grain boundary) |
| Comparative Example 4 | 3N~3N6 (99.93%~99.96%) | 100 × 100 | 3.25 (across grain boundary) |
| Comparative Example 5 | / | / | / |

Notes:
In Table 3, for the data in the column Purity of Purified Copper Foil, what is in parentheses is purity percentage of corresponding copper foil.

To sum up, the purification method for a copper foil provided in the present disclosure can directly purify the industrial polycrystalline copper foil, and alleviate the problems of high energy consumption and high preparation difficulty of the existing purification method, and meanwhile can monocrystallize the industrial polycrystalline copper foil and improve the product performance.

The above-mentioned are merely for specific examples of the present disclosure and not intended to limit the present disclosure. For those skilled in the art, various modifications and variations could be made to the present disclosure. Any modifications, equivalent substitutions, improvements and the like made within the spirit and principle of the present disclosure should be covered within the scope of protection of the present disclosure.

INDUSTRIAL APPLICABILITY

The present disclosure provides a purification method for a copper foil. The purification method can directly purify the industrial polycrystalline copper foil, and alleviate the problems of high energy consumption and high preparation difficulty of the existing purification method, and meanwhile can monocrystallize the industrial polycrystalline copper foil and improve the product performance; moreover, the purified single-crystal copper foil obtained in the present disclosure has a smooth surface and high product performance, and thus has excellent industrial applicability.

What is claimed is:

1. A purification method for a copper foil, comprising:
placing an assembly in a central temperature zone of a tubular furnace, and annealing for at least 5 h in a mixed atmosphere of an inert gas and hydrogen under a condition that a temperature of the central temperature zone is maintained at 1050-1070° C., to obtain a purified single-crystal copper foil;
wherein the assembly is composed of a polycrystalline copper foil containing impurities and a carrier supporting the polycrystalline copper foil, the polycrystalline copper foil is a rolled copper foil, a flow rate of the inert gas is 500-600 sccm, and a flow rate of the hydrogen is 30-100 sccm;
wherein the carrier is a graphite paper and a quartz plate supporting the graphite paper, and the polycrystalline copper foil is placed on a side of the graphite paper facing away from the quartz plate; and
wherein an impurity content of the graphite paper is not greater than 200 ppm, and a purity of the quartz plate is not less than 6 N.

2. The purification method for a copper foil according to claim 1, wherein the temperature of the central temperature zone is 1050-1065° C.

3. The purification method for a copper foil according to claim 2, wherein the annealing lasts for 5-10 h.

4. The purification method for a copper foil according to claim 2, wherein the flow rate of the hydrogen is 30-60 sccm, and a ratio of the flow rate of the inert gas to the flow rate of the hydrogen is 10-20:1.

5. The purification method for a copper foil according to claim 2, wherein the purification method for the copper foil further comprises: after completing the annealing, maintaining the atmosphere in the tubular furnace unchanged and naturally cooling.

6. The purification method for a copper foil according to claim 2, wherein the polycrystalline copper foil has a thickness of 3-50 μm.

7. The purification method for a copper foil according to claim 1, wherein the annealing lasts for 5-10 h.

8. The purification method for a copper foil according to claim 1, wherein the flow rate of the hydrogen is 30-60 sccm, and a ratio of the flow rate of the inert gas to the flow rate of the hydrogen is 10-20:1.

9. The purification method for a copper foil according to claim 8, wherein the ratio of the flow rate of the inert gas to the flow rate of the hydrogen is 13-17:1.

10. The purification method for a copper foil according to claim 1, wherein the tubular furnace is provided with plugs at two ends, and the purification method for the copper foil comprises: removing a plug from at least one end of the tubular furnace before the annealing.

11. The purification method for a copper foil according to claim 10, wherein the purification method for the copper foil comprises: removing the plugs at the two ends of the tubular furnace before the annealing.

12. The purification method for a copper foil according to claim 1, wherein the purification method for the copper foil further comprises: after completing the annealing, maintaining the atmosphere in the tubular furnace unchanged and naturally cooling.

13. The purification method for a copper foil according to claim 1, wherein the polycrystalline copper foil has a thickness of 3-50 μm.

* * * * *